US007452835B2

(12) United States Patent
Bridges

(10) Patent No.: US 7,452,835 B2
(45) Date of Patent: Nov. 18, 2008

(54) NONWOVEN INSULATIVE BLANKET

(75) Inventor: Cliff Bridges, Greensboro, NC (US)

(73) Assignee: PGI Polymer, Inc., Charlotte, NC (US)

( * ) Notice: Subject to any disclaimer, the term of this patent is extended or adjusted under 35 U.S.C. 154(b) by 294 days.

(21) Appl. No.: 11/335,748

(22) Filed: Jan. 19, 2006

(65) Prior Publication Data

US 2006/0228971 A1 Oct. 12, 2006

Related U.S. Application Data

(60) Provisional application No. 60/645,252, filed on Jan. 19, 2005.

(51) Int. Cl.
*D04H 1/46* (2006.01)
*D04H 3/00* (2006.01)
*B32B 3/00* (2006.01)
*B32B 5/26* (2006.01)

(52) U.S. Cl. ......................... 442/408; 428/72; 428/196; 428/198; 442/381; 442/382; 442/401

(58) Field of Classification Search ................. 442/381, 442/382, 401–408; 428/72, 73, 195.1, 196, 428/198

See application file for complete search history.

(56) References Cited

U.S. PATENT DOCUMENTS 3,338,992 A 8/1967 Kinney
4,170,676 A 10/1979 Thomas
4,536,361 A 8/1985 Torobin
5,057,368 A 10/1991 Largman et al.
5,322,736 A 6/1994 Boyle et al.
5,475,903 A 12/1995 Collins
5,679,379 A 10/1997 Fabbricante et al.
5,834,119 A 11/1998 Roop
5,882,769 A * 3/1999 McCormack et al. ....... 428/152
6,114,017 A 9/2000 Fabbricante et al.
6,382,526 B1 5/2002 Reneker et al.
6,520,425 B1 2/2003 Reneker
6,695,992 B2 2/2004 Reneker
7,005,395 B2 * 2/2006 Zafiroglu et al. ............ 442/352
2004/0096620 A1 5/2004 Dillinger
2005/0061356 A1 * 3/2005 Wong et al. .................... 134/6

* cited by examiner

*Primary Examiner*—Jenna-Leigh Johnson
(74) *Attorney, Agent, or Firm*—Kilyk & Bowersox, PLLC; Valerie Calloway

(57) ABSTRACT

A nonwoven blanket embodying the principles of the present invention includes at least two layers, wherein a first layer comprises a spunlace fabric that exhibits one or more raised regions within the fabric. The blanket of the present invention also includes a second durable and protective layer comprising one or more layers of spunmelt fabrics, typically referred to as spunbond and meltblown fabrics. The two layers are mechanically bonded via one or more methods known in the art so as to form at least one or more insulative air pockets within the blanket.

10 Claims, 4 Drawing Sheets

10
12
18
24
24
24

180
160
170
140
120
100
110

NONWOVEN INSULATIVE BLANKET

CROSS-REFERENCE TO RELATED Art

This application claims the benefit of priority Provisional Application No. 60/645,252, filed Jan. 19, 2005, the disclosures of which are incorporated herein by reference.

TECHNICAL FIELD

The present invention relates generally to nonwoven blankets, and a method of making a nonwoven blanket exhibiting improved insulative characteristics, permitting use of the nonwoven in a wide variety of blanket applications.

BACKGROUND OF THE INVENTION

Nonwoven fabrics are suitable for use in a wide variety of end uses and are known in the art to be suited for blanket applications. In the past, blankets manufactured of nonwoven fabrics have consisted of layers that have been mechanically entangled by needling as taught in U.S. Pat. No. 4,170,676 or entangled by hydraulic jets as described in U.S. published patent application 2004/0096620. Further, the fabrics have been napped to enhance the softness of the blanket and also embossed so as to impart an aesthetic appeal to the blanket. In attempt to provide a blanket with improved insulative properties, nonwoven fabrics have been laminated on either side of a foam layer. Although foam may contribute to the thermal performance of the blanket, the foam also adds bulk to the blanket, which makes it a more cumbersome article to tote.

Shelters and rescue mission organizations are known to assist individuals, families, cities, as well as entire countries during times of hardship. The need exists for inexpensive limited use or disposable blankets, whereby nonwoven fabrics have been found to fulfill this need due to the efficiency with which the fabrics can be manufactured. Nonwovens can offer a significant economic advantage for limited use applications versus traditional textiles. Airlines, institutions, such as detention centers, nursing homes, churches, schools, hospitals, in addition to fire and medical rescue squads would greatly benefit from the use of low cost, disposable or limited use nonwoven blankets. While the prior art has attempted to fulfill this necessity, a need remains for a limited use nonwoven blanket that provides improved insulative properties, durability, water repellency, softness, as well as aesthetic appeal.

SUMMARY OF THE INVENTION

The present invention relates to a method of manufacturing a nonwoven blanket exhibiting improved insulative characteristics, as well as water repellency, while exhibiting an aesthetic appeal by way of one or more surface protrusions, permitting use of the nonwoven in a wide variety of limited use blanket applications.

In accordance with the present invention, a method of making a nonwoven blanket embodying the principles of present invention includes at least two layers, wherein a first layer comprises a spunlace fabric that exhibits one or more raised regions within the fabric. The raised regions may include a single or repeating pattern of a company insignia or logo, as well as a repeating or random pattern of shapes and designs, such as nubs, twills, knits, weaves, floral patterns, greenery, camouflage, animals, characters, and a combination thereof. Further, the spunlace fabric may be subject to additional mechanical or chemical post treatments.

The blanket of the present invention also includes a second durable and protective layer comprising one or more layers of spunmelt fabrics, typically referred to as spunbond and meltblown fabrics. A spunbond fabric may be used alone or in laminate form. Non-limiting examples include spunbond/meltblown, spunbond/meltblown/spunbond, and spunbond/spunbond. Further, the durable and protective layer may also be subjected to mechanical and/or chemical post treatments.

The present invention is further directed to a method of making. In one embodiment of the present invention, a first spunlace layer and second spunbond layer are positioned face-to-face. Subsequently, the two layers are mechanically bonded via one or more methods known in the art so as to form at least one or more insulative air pockets within the blanket. The insulative pockets enhance the insulative properties of the blanket and may take the form of a linear pattern, grid pattern, or more decorative pattern throughout the blanket. Further, the blanket comprises a hydrophobic property that may either be imparted in the polymeric melt during the formation of the nonwoven fabric layers or hydrophobicity may be applied to or impregnated within the finished nonwoven product.

Other features and advantages of the present invention will become readily apparent from the following detailed description, the accompanying drawings, and the appended claims.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
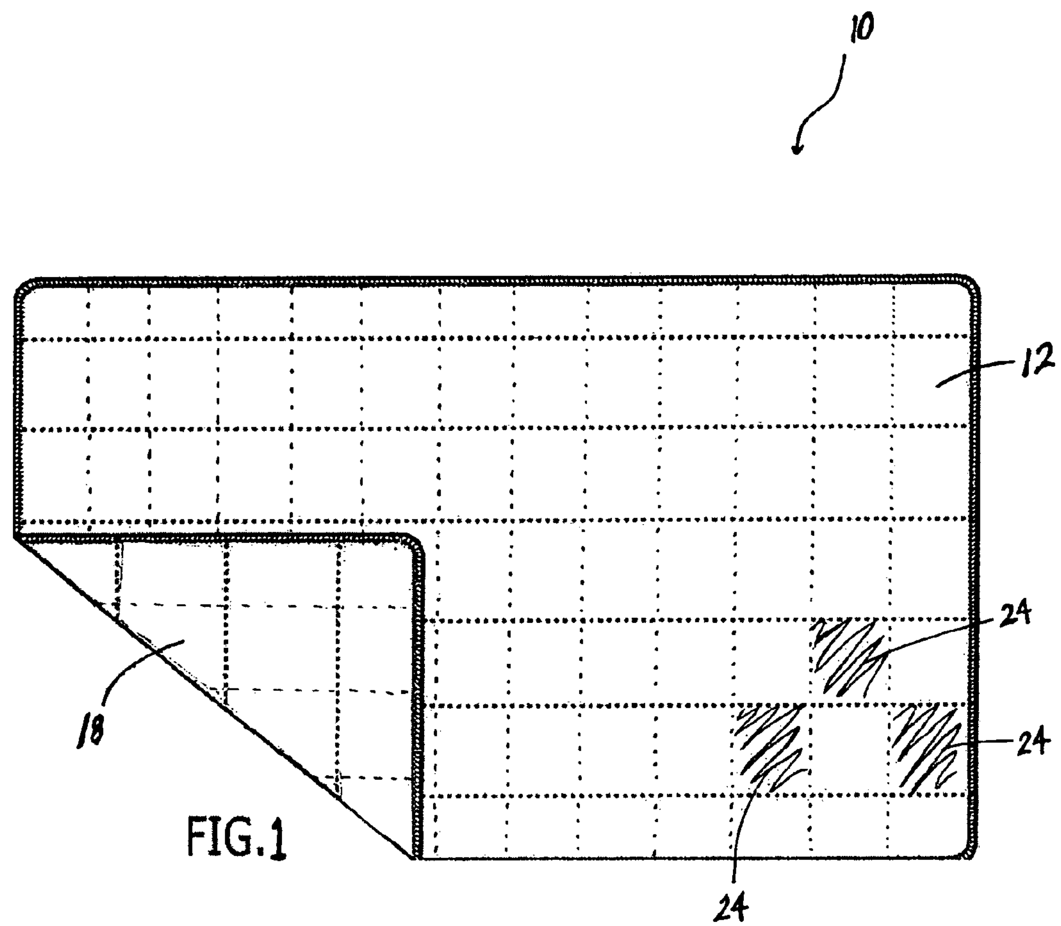
FIG. 1 is an illustrative embodiment of the insulative blanket of the present invention.
Figure 2:
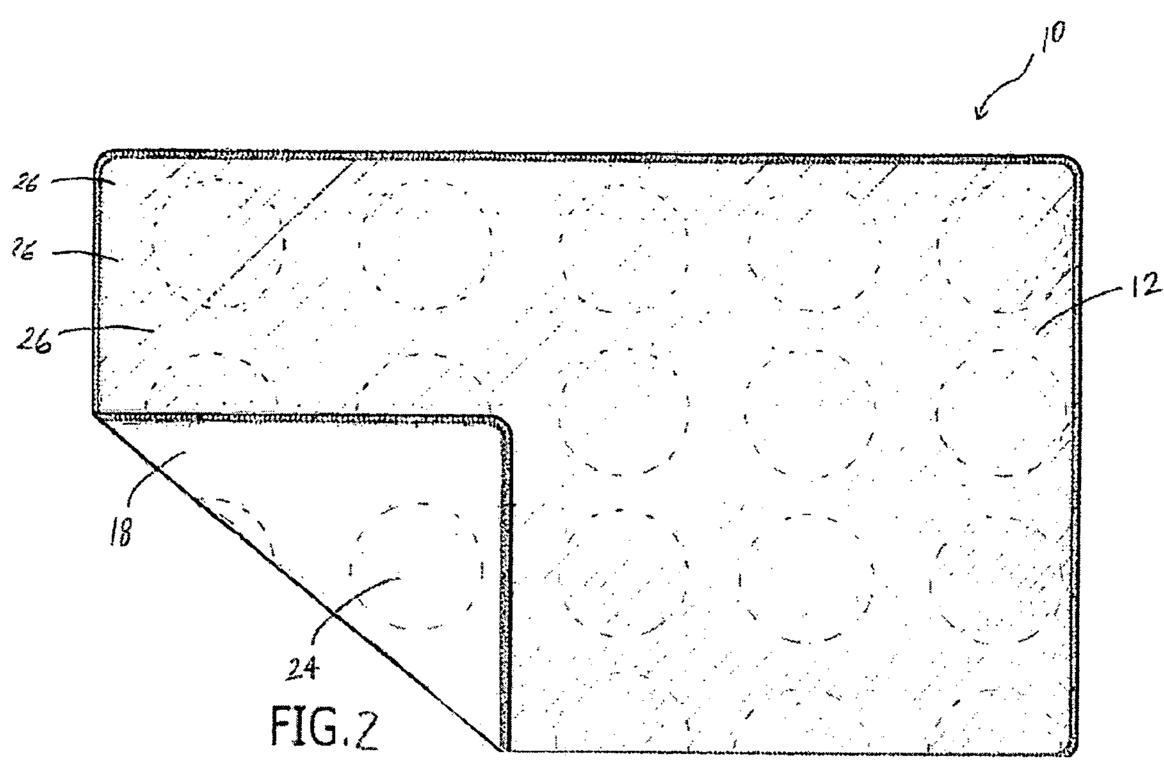
FIG. 2 is an illustrative embodiment of the insulative blanket of the present invention.
Figure 3:
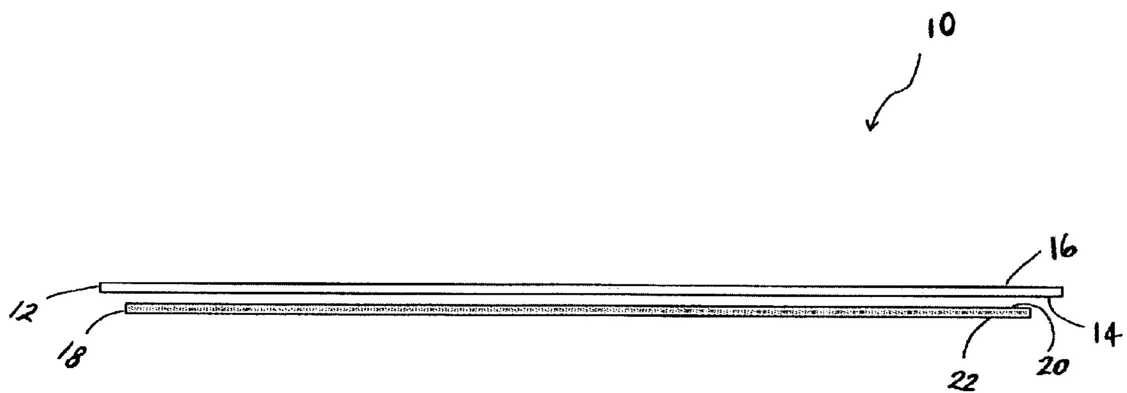
FIG. 3 is a cross-section of an illustrative embodiment of the insulative blanket.

Referring to the drawings, therein FIGS. 1-3 are illustrative embodiments of the limited use or disposable nonwoven insulative blanket 10 of the present invention, including a spunlace layer 12 having an inner surface 14 and an outer surface 16 and a continuous filament layer 18 having an inner surface 20 and an outer surface 22. The inner surface 14 of the spunlace layer 12 and the inner surface 20 of the continuous filament layer 18 are positioned face-to-face and bonded, so as to form two or more insulative pockets 24. "Insulative pocket" is defined herein as a sealed area wherein the spunlace layer 12 and continuous filament layer 18 are unbonded inside the perimeter of the sealed area. In addition, the nonwoven insulative blanket may include raised regions 26 so as to impart aesthetic appeal to at least one side of the blanket. In one embodiment, and as illustrated in FIG. 2, the raised regions 26 may take the form of a ribbed pattern.

Spunlace Layer

The spunlace layer is of a carded fibrous matrix of staple fiber including natural fiber, synthetic fiber, and combinations thereof. Suitable natural fibers may include wood pulp, cotton, rayon, kemp, flax, and combinations thereof, while suitable synthetic fibers, which may be blended in whole or part, include thermoplastic and thermoset polymers, such as polyolefins, including polyethylene and polypropylene, polyethylene and polypropylene copolymers, polyamides and polyesters. It is further contemplated to include elastomeric fibers, wherein suitable elastomers include without limitation a polyurethane elastomer, a copolyether ester, a polyether block polyamide copolymer, an ethylene vinyl acetate (EVA) elastomer, a styrenic block copolymer, an ether amide block copolymer, an olefinic elastomer, such as polyethylene and polypropylene, as well as other elastomers known to those skilled in the polymer art. The thermoplastic and thermoset polymers may be further selected from homopolymers, copolymers, multi-components, and combinations thereof.

The orientation of fibers with respect to the cross-direction and machine-direction, can significantly impact upon the resultant properties and characteristics of the nonwoven fabric. As will be recognized by those familiar with the art, a nonwoven layer may be formed by a "100% in-line card", which refers to a staple fiber web formed entirely from carded fibers, wherein all of the fibers are principally oriented in the machine direction of the web. In contrast, a fibrous web formed by "all cross-lap" refers to a fibrous web wherein the fibers have been formed by cross-lapping a carded web so that the fibers are oriented at an angle relative to the machine direction of the resultant web. A web can be formed by "one-half crosslap, one-half card", wherein one-half of the basis weight of the web includes a carded fiber web, and one-half of the basis weight includes a cross-lap fiber web. A fibrous web may further be formed with combinations of in-line carded fibers with machine direction orientation, and cross-directional randomized fibers. U.S. Pat. No. 5,475,903, entitled, "Composite Nonwoven Fabric and Method", issued on Dec. 19, 1995, in the name of inventor Collins, illustrates a web drafting apparatus and is hereby incorporated by reference.

Continuous Filament Layer

The thermoplastic polymers typically chosen to form the continuous filament spunbond layer include polyolefins, polyesters, polyamides, and halopolymers, with ethylene-fluorocarbon copolymers, particularly ethylene-chlorotrifluoroethylene (ECTFE). The polyolefins may include polypropylene, polyethylene, as well as copolymers, derivatives, and combinations thereof. Further, the continuous filaments may include homogeneous, bicomponent, and/or multi-component profiles, as well as, performance modifying additives, and the blends thereof. Further still, filaments with varying geometric cross-sections may be utilized. Exemplary filaments are disclosed in U.S. Pat. No. 5,057,368, entitled, "Filaments having trilobal or quadrilobal cross-sections", issued on Oct. 15, 1991, in the name of inventors Largman, et al., U.S. Pat. No. 5,322,736, entitled, "Hollow-trilobal cross-section filaments", issued on Jun. 21, 1994, in the name of inventors Boyle, et al., and U.S. Pat. No. 5,834,119, entitled, "Filament cross-sections", issued Nov. 10, 1998, in the name of inventor Roop, which are hereby incorporated by reference.

Depending on the blanket end-use application, it may be desirable to have a blanket that exhibits a high degree of strength. It has been contemplated that utilizing polymeric resins with low melt indexes, such as between about 5 to about 20 Ml may enhance the strength of the blanket; however, it is also suitable to utilize polymeric resins with higher melt indexes, about 20 to about 35 Ml, depending on the application.

In one embodiment, the nonwoven blanket of the present invention may include extruded and thermally bonded continuous polyethylene filaments. The resultant blanket has excellent drapeability and hand with a preferred basis weight of about 50 to about 200 grams per square meter and a most preferred basis weight of about 85 to about 130 grams per square meter. Prior to extrusion of the filaments, a pigment may be optionally added to the polymeric melt to impart a color into the blanket. Further, subsequent to thermal bonding, the blanket fabric may be subjected to a napping post treatment so as to enhance desired insulative, tactile, and visual properties often sought in a blanket.

Optionally, the continuous filament layer may be further hydroentangled on an imaged forming surface, wherein such surfaces include three-dimensionally surfaced belt, metal drums, wire screens, and three-dimensional image transfer devices. Such surface treatments enhance the aesthetic appearance of the continuous filament layer, as well as improve the overall bulk and hand of the blanket.

Method Of Making

The present invention further includes a method of making a disposable or limited use blanket, wherein the method includes providing at least one spunlace layer having an inner surface and an outer surface. Manufacture of a spunlace layer involves a hydroentangling process. Hydroentangling is described in aforementioned U.S. Pat. No. 3,485,706, previously incorporated by reference.

Figure 4:
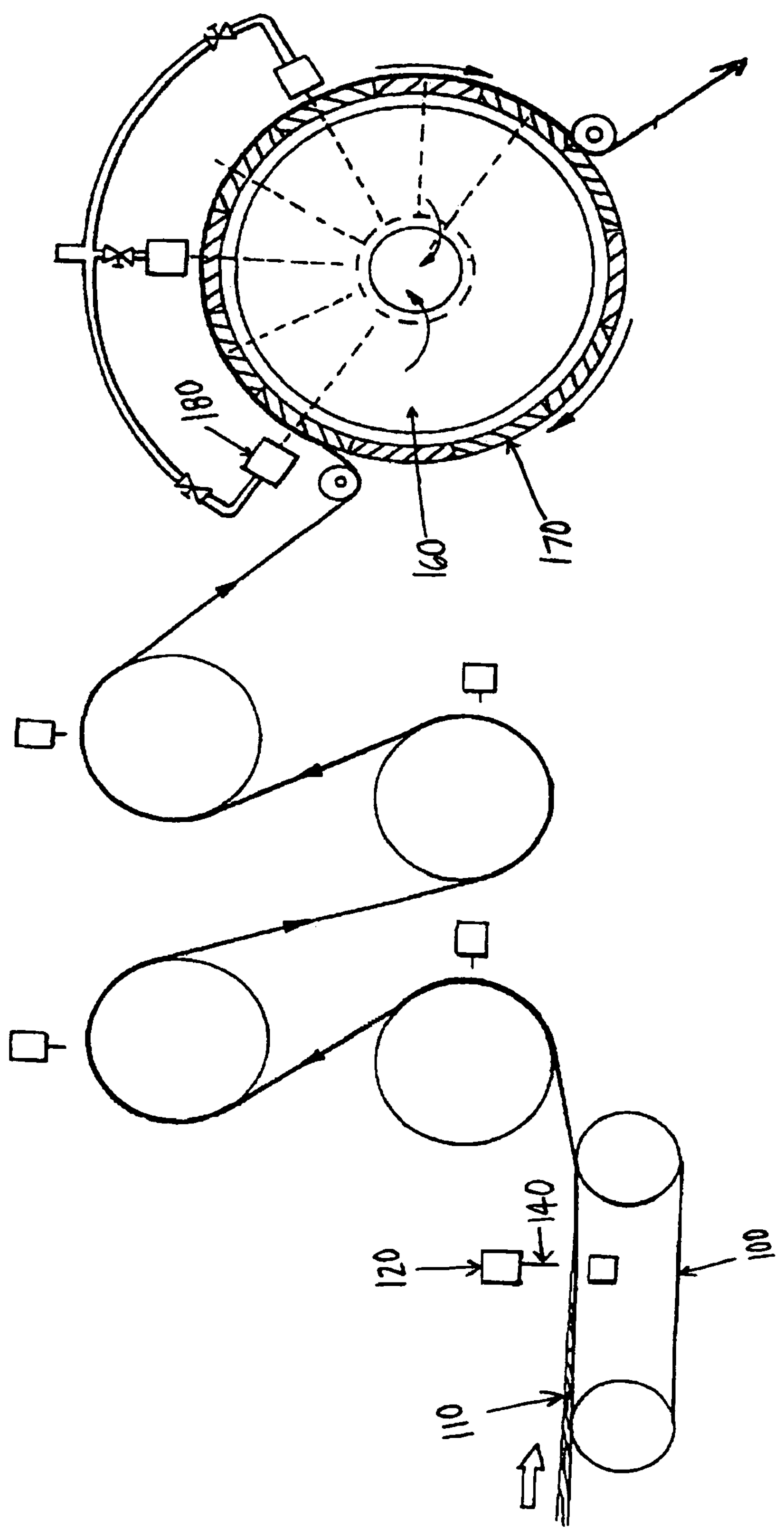
FIG. 4 is an apparatus suitable for hydroentangling in accordance with the method of making the present invention.

FIG. 4 diagrammatically illustrates an apparatus for practicing a suitable method for hydroentangling the nonwoven fabric. As shown, a precursor web 110 is initially received on a belt 100. Precursor web 110 is subjected to the first of a series of hydroentangling treatments on belt 100. Hydroentanglement of the web 110 being carried by belt 100 is affected by nozzle assembly 120, which is operated to discharge high-pressure columnar jets or streams of liquid 140, typically water. The precursor web 110 is typically subjected to entanglement energy generally on the order of 0.05 to 0.30 horsepower-hour per pound, with the web optionally directed to a hydroentangling apparatus for patterned hydroentanglement of the precursor web.

The entangled web may be moved to an entangling drum 160, which includes a foraminous surface 170, such as a laser ablated sleeve, perforated metal drum, embossed screens or belts, and the like. Nozzle assembly 180 is configured like nozzle assembly 120, and effects further entanglement of the pre-entangled fibrous web, while imparting one or more raised regions. One suitable foraminous surface (sometimes referred to as an ITD, or image transfer device) is disclosed in U.S. Pat. No. 5,098,764, entitled, "Non-woven fabric and method and apparatus for making the same", issued on May 24, 1992, in the name of inventors Bassett, et al., hereby incorporated by reference. Once entangled and optionally imparted with one or more raised regions, the spunlace layer may be dewatered, dried by one of various methods known in the art, such as by drying cans or through air heat, and wound on a roll.

The present invention may also incorporate the use of a support layer or scrim in combination with the spunlace layer, which may be any such suitable material, including, but not limited to, wovens, knits, open mesh scrims, and/or additional nonwoven fabrics. Two particular nonwoven fabrics that are of particular benefit to spunlace webs for imparting strength and improved clarity of imparted aesthetic raised regions are spunbond fabrics, as exemplified in U.S Pat. No. 3,338,992, entitled, "Process for Forming Nonwoven Filamentary Structures From Fiber-Forming Synthetic Organic Polymers", issued on Aug. 29, 1967 to inventor Kinney and nanofiber fabrics as exemplified in U.S. Pat. No. 4,536,361, entitled, "Method for Producing Plastic Microfilaments", issued Aug. 20, 1985 to inventor Torobin and U.S. Pat. No. 6,114,017, entitled, "Micro-Denier Nonwoven Materials Made Using Modular Die Units", issued Sept. 5, 2000 to inventors Fabbricante, et al., all of which are hereby incorporated by reference.

Subsequent to hydroentanglement, the spunlace layer may be subjected to one or more chemical and/or mechanical post treatments. Chemical post treatments include the application of one or more additives, such as pigments, aromatics, antimicrobials, fire retardants, thermochromics, hydrophobic chemistries, and the combinations thereof. Mechanical post treatments include without limitation napping, jet dyeing, mechanical compaction as practiced in micrexing or sanforizing (Sanforized is a registered trademark of Cluett, Peabody & Co., Inc), and combinations thereof. Also, the spunlace layer can be quilted.

The method of making an insulative blanket of the present invention further includes a continuous filament layer. A continuous filament layer is produced by a spunbond process. The spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are usually collected as a loose web upon a moving foraminous surface, such as a wire mesh conveyor belt. When more than one spinneret is used in line for the purpose of forming a multilayered fabric, the subsequent web is collected upon the uppermost surface of the previously formed web. The web is usually at least temporarily consolidated, typically by utilizing heat and pressure, such as by thermal point bonding. Using this bonding method, the web or layers of webs are passed between two hot metal rolls, one of which has an embossed pattern to impart and achieve the desired degree of point bonding, usually on the order of 10 to 40 percent of the overall surface area being so bonded.

It is further within the purview of the present invention to include one or more discontinuous filament webs through application of the meltblown process. The melt-blown process is related to the spunbond process for forming a layer of a nonwoven fabric, wherein, a molten polymer is extruded under pressure through orifices in a spinneret or die. High velocity air impinges upon and entrains the filaments as they exit the die. The energy of this step is such that the formed filaments are greatly reduced in diameter and are fractured so that microfibers of finite length are produced. This differs from the spunbond process whereby the continuity of the filaments is preserved.

Nano-filaments may be incorporated into one or mote layers of the insulative blanket as well. The diameters of nanofilaments are generally understood to be less than about 1000 nanometer or one micron. Suitable nano-filament layers can be formed by either direct spinning of nano- filaments or by formation of a multi-component filament, such as islands-in-the-sea, segmented pie, or other configurations, which is divided into nano-filaments. These filaments are often referred to in the art as splittable fiber. U.S. Pat. No. 5,679,379, entitled, "Disposable extrusion apparatus with pressure balancing modular die units for the production of nonwoven webs", issued Oct. 21, 1997, and incorporated herein by reference, exemplifies direct spinning processes practicable in support of the present invention.

Additional nano-filament technologies suitable for use with the present invention are described in U.S. Pat. No. 6,382,526, entitled, "Process and apparatus for the production of nanofibers", issued May 7, 2002, in the name of inventors Reneker, et al., U.S. Pat. No. 6,520,425, entitled, "Process and apparatus for the production of nanofibers", issued Feb. 18, 2003, and U.S. Pat. No. 6,695,992, also entitled, "Process and apparatus for the production of nanofibers", issued Feb. 24, 2004, both in the name of inventor Reneker, all of which are hereby incorporated by reference.

It is further contemplated that prior to extrusion, the molten polymer can be compounded with various performance enhancing melt-additives, such as thermal stabilizers, softening agents, antimicrobial agents, fragrances, fire-retarding agents, cross-linking agents, slip additives, agents for imparting hydrophobicity, UV, anti-stats, colorants, and nucleating agents. A nucleating agent may be specifically compounded to produce a more stable spinning process, and, at equal process conditions, can produce a further increase in strength. The fabric may be subjected to the application of additional additives as post treatments to fabric formation, such as insect repellents, fragrances, and dyes.

In one embodiment, at least one preformed spunlace layer and at least one preformed continuous filament layer are positioned in a face-to-face relationship. The spunlace layer and continuous filament layer may be stitch-bonded, ultrasonically bonded, thermally point bonded, or hot roll calendared so as to form two or more insulative pockets within the blanket.

Blanket Applications

The blanket of the present invention may be disposed of after a single use. Alternately, the blankets may be considered semi-reusable, wherein the blanket may be used a limited number of times before needing to be replaced. Such blankets may be used as recreational blankets, such as camping, picnicking, and sporting event blankets, emergency rescue blankets, airline blankets, institutional blankets, such as for detention centers, shelter, non-profit relief organizations, nursing homes, churches, schools, and hospitals, as well as in other applications where blankets of limited use are required or in cases where blankets are used once before being discarded.

Preferably, the nonwoven blanket of the present invention has a basis weight in the range of about 50-200 gsm, and more preferably has a basis weight in the range of about 85-130 gsm. The nonwoven blanket of the present invention is easily foldable, storable, and transportable. Further, the disposability of the blanket eliminates the need for a cleaning process, which may potentially leave behind pathogens if not performed according to specifications.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A limited use nonwoven insulative blanket, comprising:

a first spunlace layer having an inner surface and outer surface, wherein said spunlace layer comprises a hydroentangled carded fibrous matrix comprising staple fibers, and wherein the spunlace layer is quilted as a mechanical post-treatment thereof;

a second continuous filament layer having an inner surface and outer surface, wherein the inner surface of the continuous filament layer is positioned face-to-face with the inner surface of the spunlace layer; and the spunlace layer is bonded to the continuous filament layer in a pattern forming two or more insulative pockets comprising unbonded areas within the blanket, wherein said pockets enhance the insulative properties of the blanket, and wherein the blanket has a basis weight of about 85 to 200 gsm.

2. A limited use nonwoven insulative blanket as in claim 1, wherein the spunlace layer includes one or more raised surfaces.

3. limited use nonwoven insulative blanket as in claim 1, wherein the spunlace layer and continuous filament layer are mechanically secured to form said two or more insulative pockets.

4. A limited use nonwoven insulative blanket as in claim 3, wherein the spunlace layer and continuous filament layer are ultrasonically bonded to form said two or more insulative pockets.

5. A limited use nonwoven insulative blanket as in claim 3, wherein the spunlace layer and continuous filament layer are stitched to form said two or more insulative pockets.

6. A limited use nonwoven insulative blanket as in claim 1, wherein the spunlace layer and the continuous filament layer are hot roll calendared to form said two or more insulative pockets.

7. A limited use nonwoven insulative blanket as in claim 1, wherein the spunlace layer is hydrophobic.

8. A limited use nonwoven insulative blanket as in claim 1, wherein the continuous filament layer is hydrophobic.

9. A limited use nonwoven insulative blanket as in claim 1, wherein said insulative pockets take the form of a grid pattern throughout the blanket.

10. A limited use nonwoven insulative blanket as in claim 1, wherein said insulative pockets take the form of a circles pattern throughout the blanket.

* * * * *

UNITED STATES PATENT AND TRADEMARK OFFICE

CERTIFICATE OF CORRECTION

PATENT NO. : 7,452,835 B2
APPLICATION NO. : 11/335748
DATED : November 18, 2008
INVENTOR(S) : Cliff Bridges It is certified that error appears in the above-identified patent and that said Letters Patent is hereby corrected as shown below:

In column 7, line 14, in Claim 3, between "3." and "limited" insert --A--.

Signed and Sealed this

Seventeenth Day of February, 2009

JOHN DOLL
*Acting Director of the United States Patent and Trademark Office*